Figure 1:
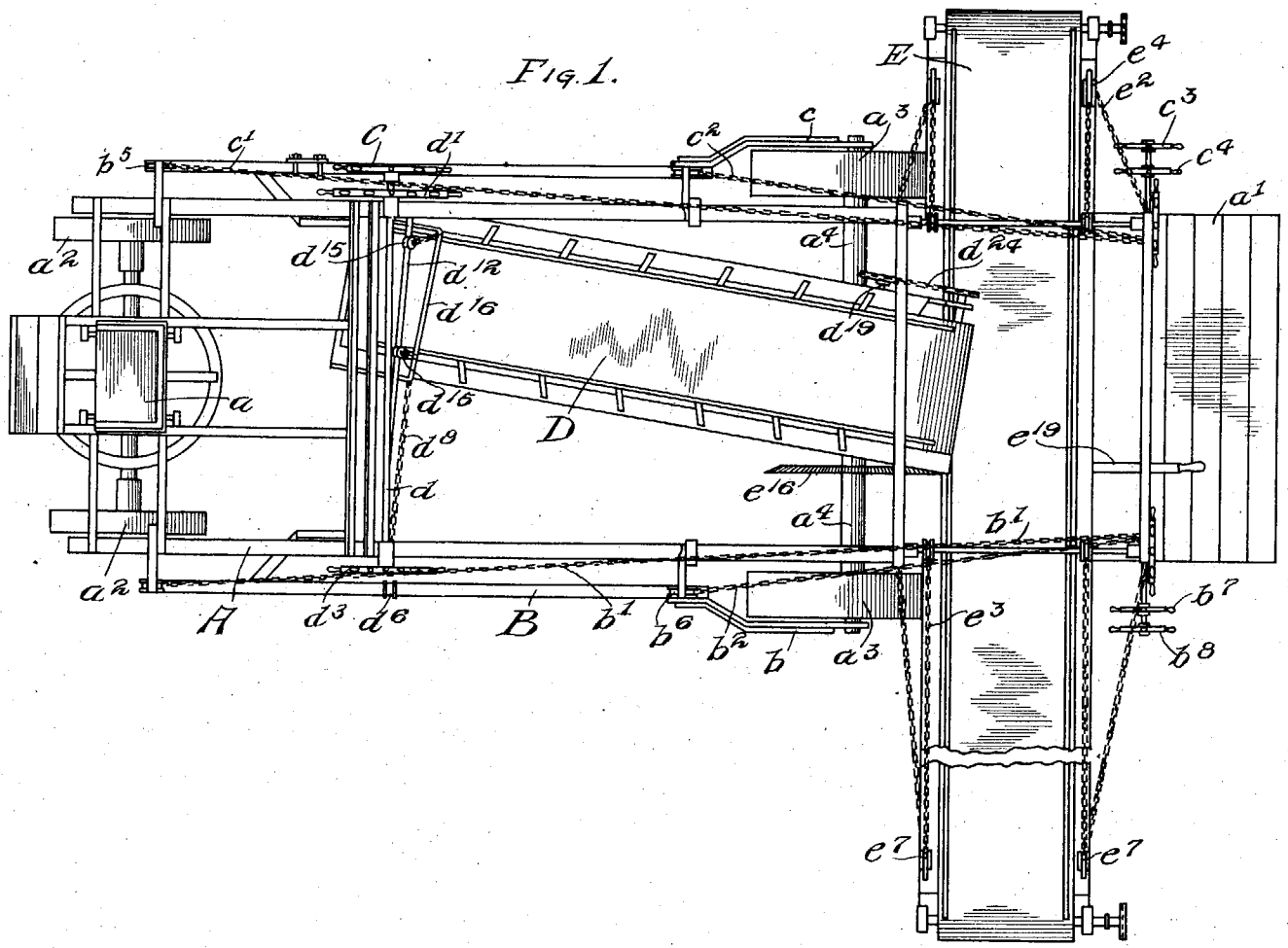

M. G. BUNNELL.

DITCHING AND GRADING MACHINE.

APPLICATION FILED JULY 25, 1908.

12,875.

Reissued Nov. 10, 1908.

7 SHEETS—SHEET 1.

WITNESSES

A. Andersen.

E. Clegg.

INVENTOR:

Morton G. Bunnell

By Bulkley, Sturand & Drury

ATTORNEYS

THE NORRIS PETERS CO., WASHINGTON, D. C.

M. G. BUNNELL.

DITCHING AND GRADING MACHINE.

APPLICATION FILED JULY 25, 1908.

12,875. Reissued Nov. 10, 1908.

7 SHEETS—SHEET 2.

WITNESSES

A. Andersen.

E. Clegg

INVENTOR:

Morton G. Bunnell

By Bakewell, Evans & Duncan

ATTORNEYS

THE NORRIS PETERS CO., WASHINGTON, D. C.

M. G. BUNNELL.

DITCHING AND GRADING MACHINE.

APPLICATION FILED JULY 25, 1908.

12,875.

Reissued Nov. 10, 1908.

7 SHEETS—SHEET 3.

WITNESSES

A. Andersen.

E. Clegg

INVENTOR:

Morton G. Bunnell

By Bulkley Burns & Berry

ATTORNEYS

THE NORRIS PETERS CO., WASHINGTON, D. C.

M. G. BUNNELL.

DITCHING AND GRADING MACHINE.

APPLICATION FILED JULY 25, 1908.

12,875. Reissued Nov. 10, 1908.

7 SHEETS—SHEET 4.

WITNESSES
A. Anderson.
E. Clegg

INVENTOR:
Morton G. Bunnell
By Bulkley Strand & Dung
ATTORNEYS

THE NORRIS PETERS CO., WASHINGTON, D. C.

M. G. BUNNELL.

DITCHING AND GRADING MACHINE.

APPLICATION FILED JULY 25, 1908.

12,875.

Reissued Nov. 10, 1908.

7 SHEETS—SHEET 5.

WITNESSES

A. Anderson.

E. Clegg.

INVENTOR.

Morton G. Bunnell

By Bulkley Duvall & Dury

ATTORNEYS

THE NORRIS PETERS CO., WASHINGTON, D. C.

M. G. BUNNELL.

DITCHING AND GRADING MACHINE.

APPLICATION FILED JULY 25, 1908.

12,875. Reissued Nov. 10, 1908.

7 SHEETS—SHEET 6.

WITNESSES

A. Andersen.

E. Clegg.

INVENTOR:

Morton G. Bunnell

By Buckley Duval & Bury

ATTORNEYS

THE NORRIS PETERS CO., WASHINGTON, D. C.

M. G. BUNNELL.

DITCHING AND GRADING MACHINE.

APPLICATION FILED JULY 25, 1908.

12,875.

Reissued Nov. 10, 1908.

7 SHEETS—SHEET 7.

WITNESSES

A. Andersen.

E. Clegg

INVENTOR:

Morton G. Bunnell

By Buckley Duncan & Irving

ATTORNEYS

THE NORRIS PETERS CO., WASHINGTON, D. C.

UNITED STATES PATENT OFFICE.

MORTON G. BUNNELL, OF PORTER, INDIANA, ASSIGNOR TO AUSTIN MANUFACTURING COMPANY, OF CHICAGO, ILLINOIS, A CORPORATION OF ILLINOIS.

DITCHING AND GRADING MACHINE.

No. 12,875. Specification of Reissued Letters Patent. Reissued Nov. 10, 1908.

Original No. 884,068, dated April 7, 1908, Serial No. 386,714. Application for reissue filed July 25, 1908. Serial No. 445,428.

*To all whom it may concern:*

Be it known that I, MORTON G. BUNNELL, a citizen of the United States of America, and resident of Porter, Porter county, Indiana, have invented a certain new and useful Improvement in Ditching and Grading Machines, of which the following is a specification.

My invention relates to ditching and grading machines of that kind in which the soil is torn up or disrupted by a plow, and then carried by a suitable conveying apparatus to a point where it is discharged from the side of the machine. In the use of machinery of this character, as heretofore constructed, it has been impossible to run the machine in opposite directions in the same excavation or cut and discharge all of the dirt so excavated on one and the same side of the excavation or cut. In certain kinds of work, where it has been necessary to discharge all of the dirt on one side of the excavation—as in the case of a ditch excavated on the side of a hill, where all of the excavated dirt should be deposited on the lower side, or in the case of a road which has a sufficient ditch on one side, but none on the other, and it is desired to excavate a ditch entirely on one side of the road—it has been necessary to run the machine idle in one direction, thereby limiting the capacity of the machine by one-half, and increasing the time necessary to complete the work. This, of course, is necessarily true where the machine has a plow only at one side thereof, and is capable of discharging the soil only at one side, because such a machine is not reversible or capable of working in either direction—that is to say, is not capable of throwing the dirt in the same direction, regardless of which way the machine is traveling. It is obvious that considerable time would be saved and efficiency gained by employing a machine which can run or work in either direction—that is to say, which is capable of running along one side of the road or cut in one direction, and which is then capable of turning around and working back along the same side of the road or cut, throwing the dirt in the same direction each time. In other words, much time and money will be saved by the use of a machine which is capable of plowing at either side, and which is capable of discharging the soil from either side thereof, regardless of which plow is being used, because with such provisions the machine will never be required to run idle from one end of the road or cut to the other, or at least the necessity for wear and tear on the machine and waste of time by idle running will be greatly reduced. Furthermore, with a machine that can discharge at either side, regardless of which plow is being used, wagons can be loaded alternately at opposite sides of the machine, without slowing down or stopping the latter. Prior to my invention, and so far as I am now aware, no entirely satisfactory reversible or two-way machine of this character has ever been proposed.

Objects of my invention are to provide a ditching and grading machine having simple and efficient provisions for plowing up the soil on either side thereof, and for discharging the soil at either side therefrom, regardless of which plow is being used, whereby the machine can be run or worked in either direction along one and the same side of the road or cut upon which the machine is being operated; to provide a ditching and grading machine in which the elevator is adapted to have its lower or receiving end swung laterally from one plow to the other, and in which one plow can be raised out of the ground while the other plow is in use; to provide a ditching and grading machine in which the elevator is adjustable laterally, so that it is adapted to receive the soil from either one of the two plows, and in which the conveying apparatus is employed for receiving the soil from the upper end of the elevator and for discharging the same from either side of the machine, regardless of which plow is in use; to provide a reversible ditching and grading machine in which a single conveyer can be moved or adjusted endwise, and in a direction transversely of the line of travel, for the purpose of discharging the soil at either side of the machine; to provide a ditching and grading machine in which the conveying apparatus by which the soil is discharged from the machine can be reversed at will for the purpose of delivering the soil at either side of the machine, whereby wagons can be loaded alternately at opposite sides of the machine, without the necessity of slowing down or stopping the same; and to provide certain details and features of improvement and combinations tending to increase the general efficiency and serviceability of a machine of this particular character.

To the foregoing and other useful ends, my invention consists in matters hereinafter described and claimed, and illustrated in the accompanying drawings, in which—

Figure 2:
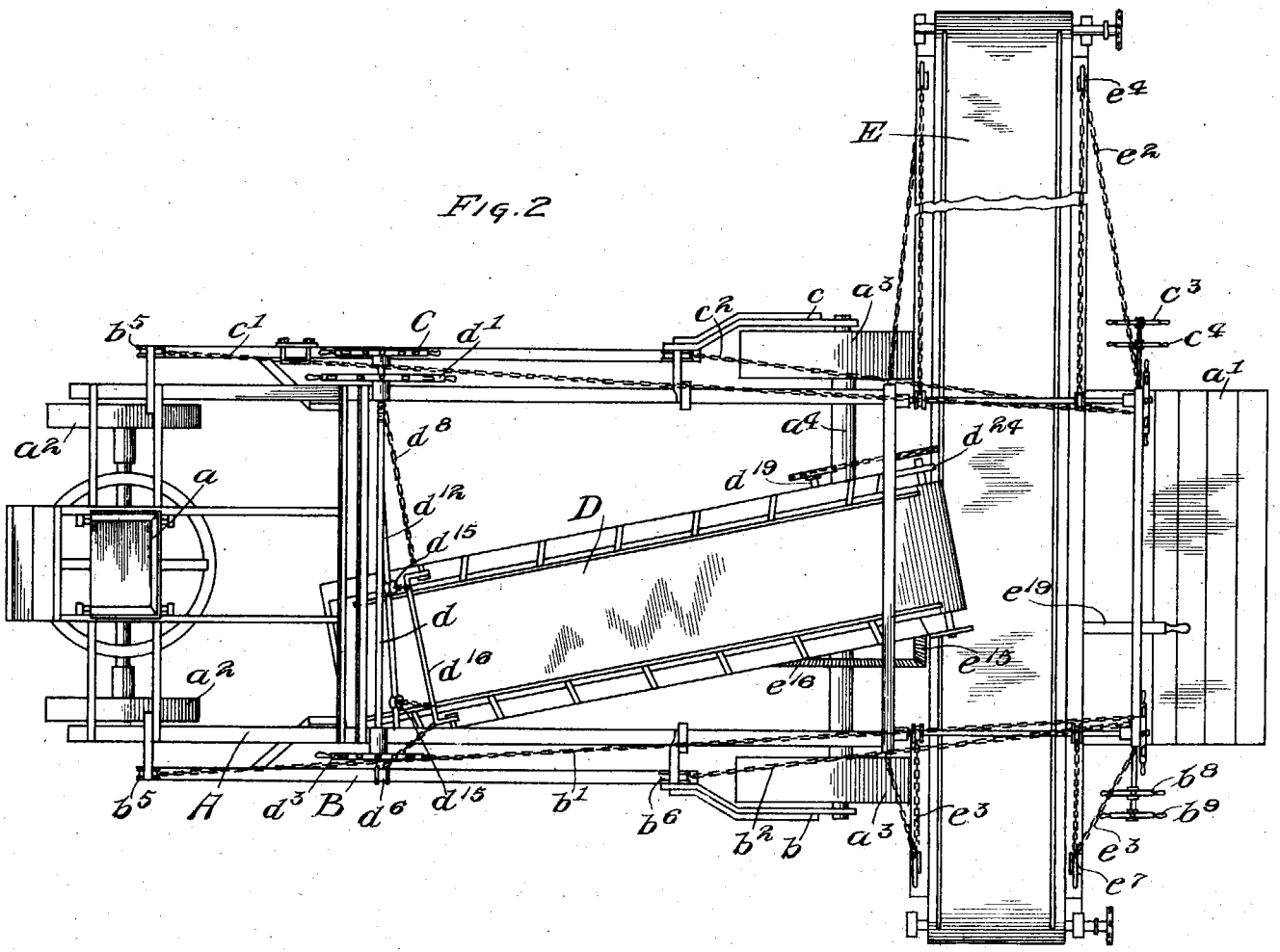
Figure 3:
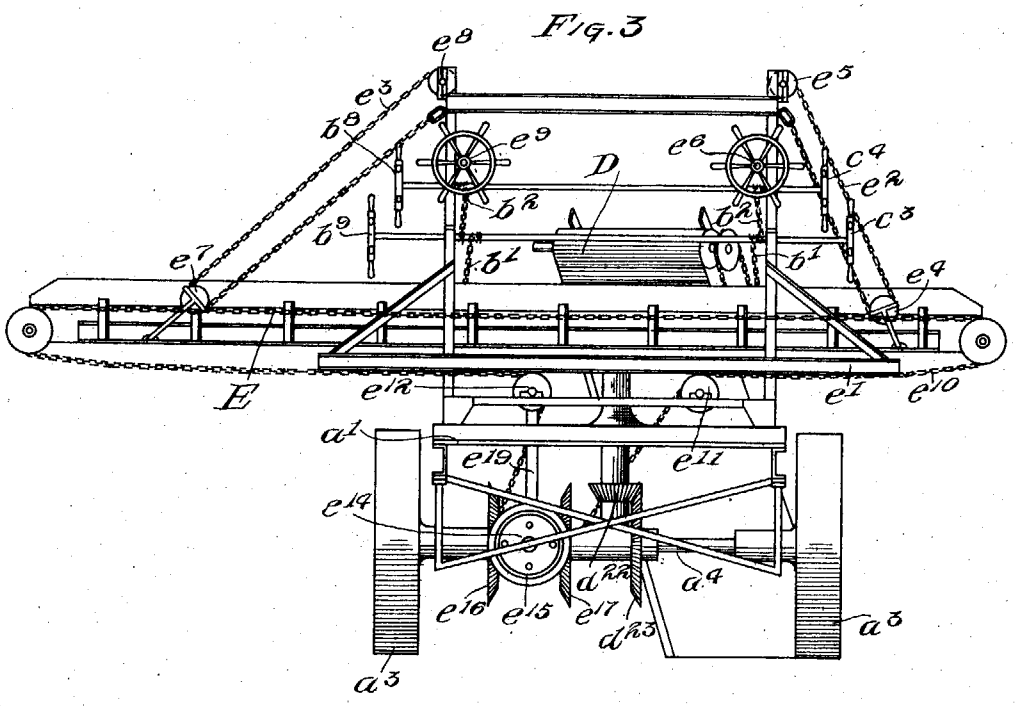
Figure 4:
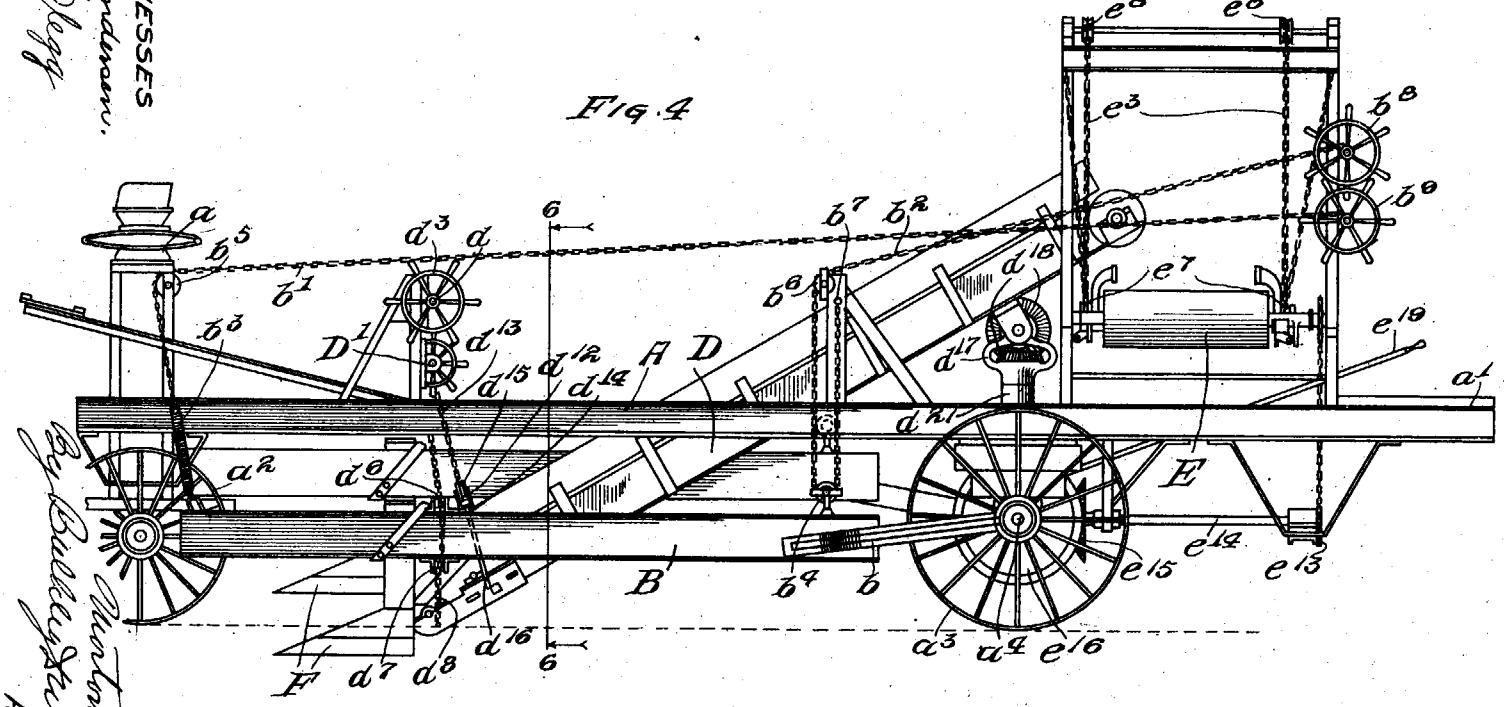
Figure 5:
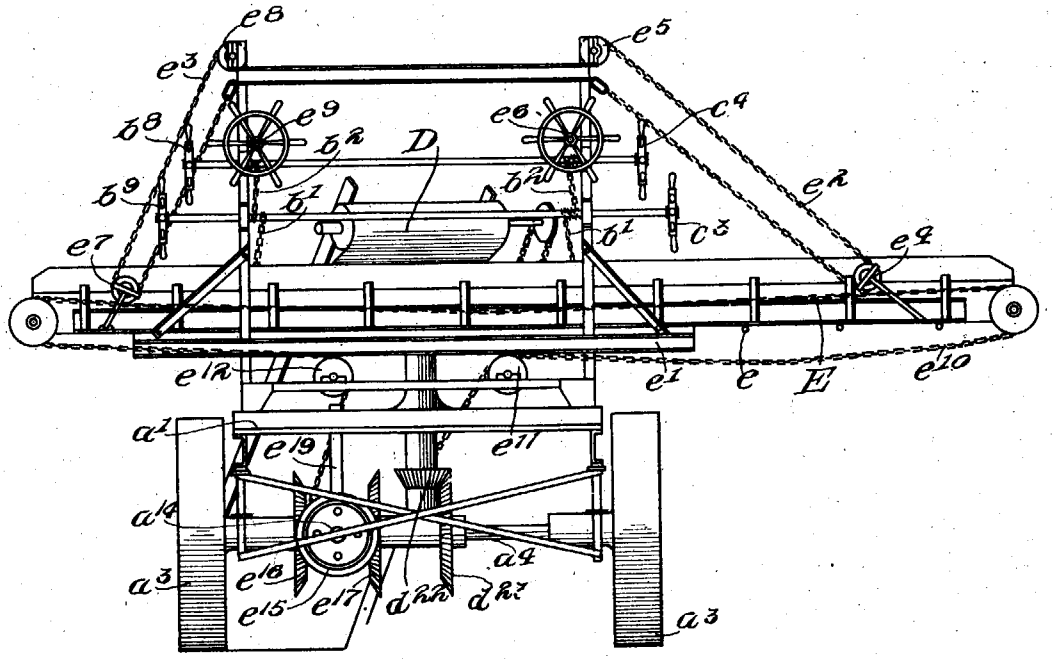
Figure 6:
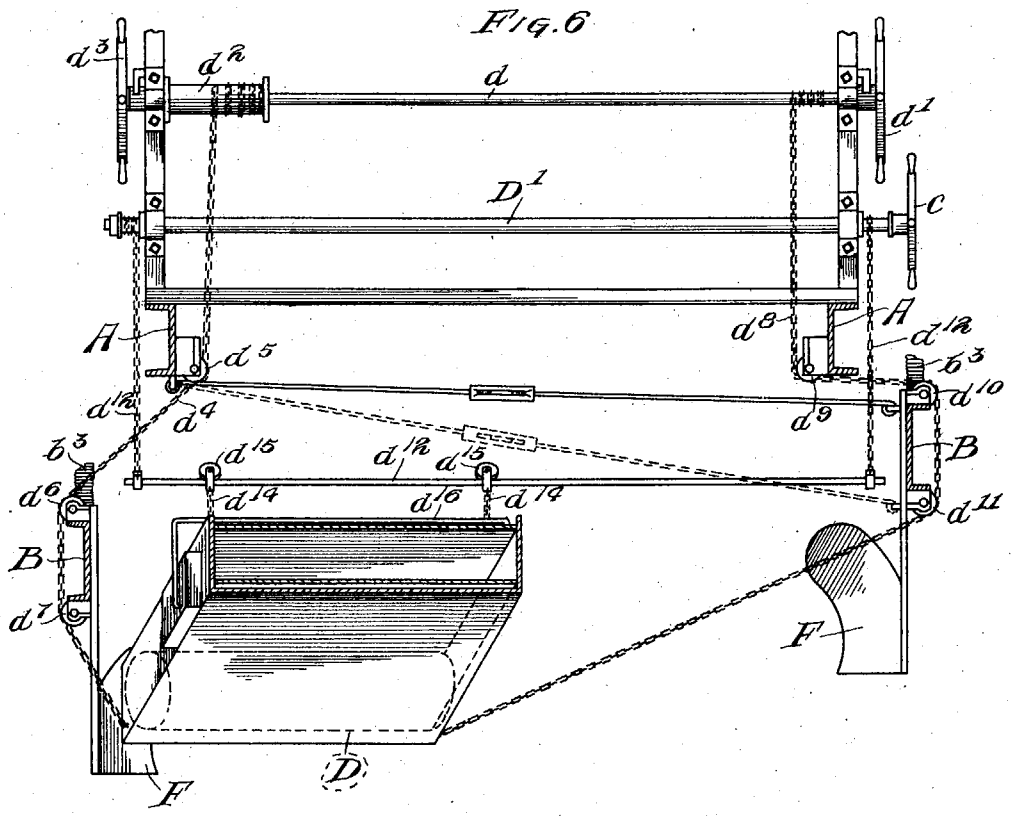
Figure 7:
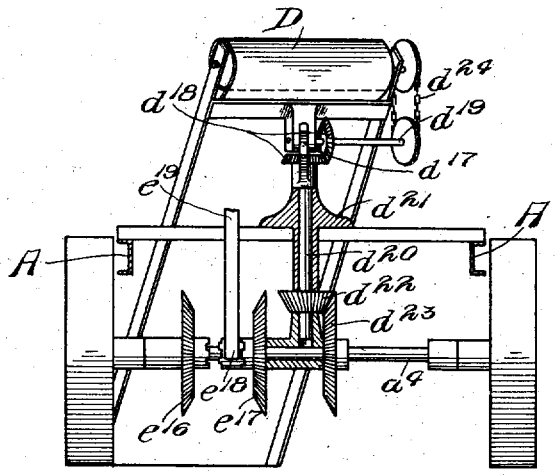
Figure 8:
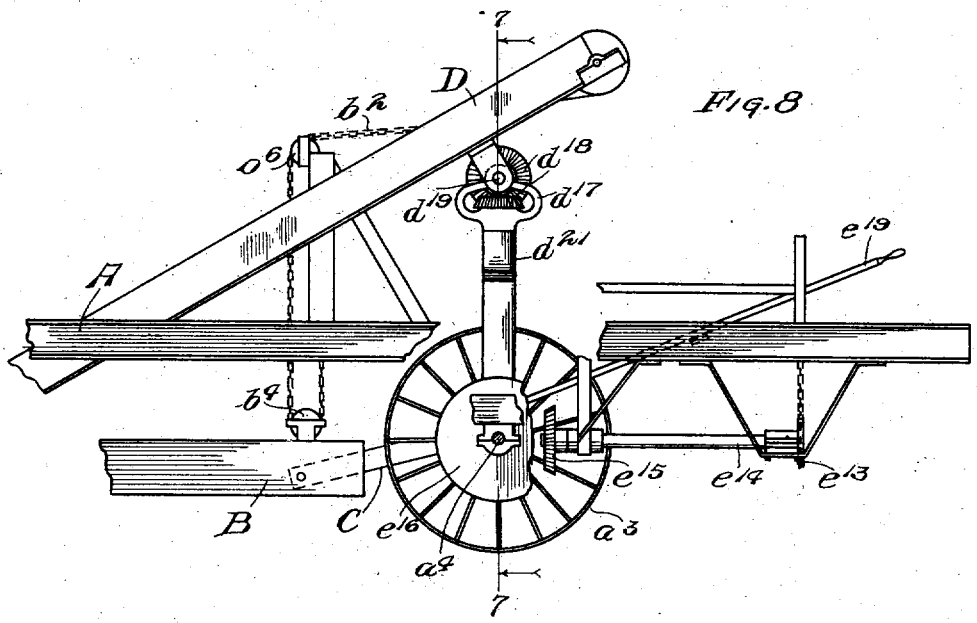

Figure 1 is a plan of a ditching and grading machine embodying the principles of my invention, showing the elevator swung over to the plow at the right hand side of the machine. Fig. 2 is a similar view showing the elevator swung over to the plow at the left hand side of the machine. Fig. 3 is a rear elevation of the machine shown in Fig. 1. Fig. 4 is a side elevation of the machine shown in Fig. 1, showing the left hand side of the machine. Fig. 5 is a rear elevation of the machine shown in Fig. 2. Fig. 6 is an enlarged cross section of the machine on line 6—6 in Fig. 4. Fig. 7 is a rear elevation, partly in section, of the driving and reversing mechanism, the section being taken on line 7—7 of Fig. 8. Fig. 8 is a side elevation of the mechanism shown in Fig. 7, certain portions being broken away for convenience of illustration.

As thus illustrated, it will be seen that the body frame A can be of any suitable construction, and is preferably provided at its forward end with a driver's seat $a$, and at its rear end with a foot-board or operating platform $a^1$, whereby the operations of the various portions of the machine may be controlled by an attendant. The forward supporting wheels $a^2$ can be arranged in any suitable manner, and the rear supporting wheels $a^3$ are preferably positioned some distance ahead of the foot-board or platform $a^1$, in the manner shown. The plow beams B and C are provided with suitable plows or implements, and are propelled by push bars $b$ and $c$, which latter have their rear ends swingingly mounted on the outer ends of the rear axle $a^4$, whereby the said plows are pushed rather than pulled. The left hand plow, for example, has the forward end of the beam B supported by an operating chain $b^1$ and a spring $b^3$, and the rear end of said beam is supported by an operating chain $b^2$. The chain $b^1$ is connected with the beam through the medium of a spring $b^3$, while the chain $b^2$ is connected with the beam through the medium of a sheave or pulley $b^4$. The chain $b^1$ runs over a sheave or pulley $b^5$ on the frame of the machine, while the chain $b^2$ runs over a sheave or pulley $b^6$ on the frame, and is also attached to the frame at $b^7$, in the manner illustrated. The chain $b^2$ is wound upon and operated by a hand shaft $b^8$ mounted above the platform or foot-board $a^1$, while the chain $b^1$ is wound upon a hand wheel shaft $b^9$. It will be seen that these two hand wheel shafts are associated together and easily operated by the attendant standing on the foot-board or platform $a^1$, whereby the plow beam B and its attached plow or implement are easily raised and lowered.

The plow beam C is raised and lowered by a similar arrangement involving the chains $c^1$ and $c^2$, which latter are operated by hand wheel shafts $c^3$ and $c^4$, which latter are similar to those previously described. It will be seen that the said plow beams have their plows positioned to throw their soil inwardly, so that either plow may deliver the soil to the lower end of the longitudinally disposed elevator D. A hand wheel shaft $d$ extends transversely of the machine, at a point above the lower and forward end of the elevator, and is provided with a hand wheel $d^1$ at one end, and a loosely mounted drum or sleeve $d^2$ at the other end, the latter operated by a similar hand wheel $d^3$. A chain $d^4$ is wound on the drum or sleeve $d^2$, and is arranged to travel over the sheaves or pulleys $d^5$, $d^6$, $d^7$, at points between its upper and lower ends. The lower end of said chain is attached to the lower end of said elevator. The chain $d^8$ has its upper end wound on the hand wheel shaft $d$ and travels over the sheaves or pulleys $d^9$, $d^{10}$, $d^{11}$, before having its other end attached to the said elevator. It will be seen that the said sheaves or pulleys $d^5$, $d^9$, are mounted on the frame or body of the machine, whereas the sheaves or pulleys $d^6$, $d^7$, $d^{10}$, $d^{11}$, are mounted on the plow beams.

A transverse rod or movable way $d^{12}$ is supported by chains $d^{13}$, which have their upper ends wound on the transverse hand wheel shaft $D^1$, in the manner shown. Supporting chains $d^{14}$ are provided at their upper ends with wheels $d^{15}$, adapted to travel on the said rod or way, and are secured at their lower ends to a bail $d^{16}$, which latter is secured to the said elevator. In this way the said elevator can be raised and lowered by rotation of the hand wheel shaft $D^1$, and can be adjusted to one side or the other by the hand wheels $d^1$, $d^3$, whereby the soil can be caused to coöperate with either plow. When one plow is in use, the other is raised, and in this way the machine can plow or tear up the soil at either side and deliver the same to the lower end of the elevator. The upper end of the elevator, which is of any suitable construction, is supported by a hinge or pivotal bearing $d^{17}$, which latter is associated with bevel gearing $d^{18}$ and the drive shaft $d^{19}$, in the manner shown more clearly in Fig. 7. A vertical shaft $d^{20}$ is mounted in a bearing $d^{21}$, and connects said bevel gearing with a lower bevel gear $d^{22}$, which latter engages a bevel gear $d^{23}$ on the axle $a^4$ of the rear supporting wheels. A sprocket gearing $d^{24}$ connects the gearing $d^{18}$ with the upper end of the elevator, whereby the latter is driven by the forward motion of the machine.

The pivotal bearing $d^{17}$ permits the lower end of the elevator to swing up and down, and the shaft $d^{20}$ provides a swivel bearing about which the forward end of the elevator can swing from one side to the other. It will be seen that these adjustments of the elevator are accomplished without disturbing the power transmitting connection between the same and the rear axle. The soil when elevated by the said elevator is discharged onto a transversely arranged conveyer E, which latter is provided on its under side with rollers $e$, adapted to travel on transverse ways or tracks $e^1$, in the manner illustrated. Said transversely arranged conveyer is adapted for endwise bodily movement in either direction, so that the soil may be discharged on either side of the machine. This is preferably accomplished through the medium of operating chains $e^2$, $e^3$, which latter are caused to travel over sheaves or pulleys $e^4$, $e^5$, for the chain $e^2$, through the medium of a hand shaft $e^6$ which operates said chain, it being observed that the pulley $e^4$ is secured to the conveyer, and that the sheave or pulley $e^5$ is on the upright frame of the machine. Said hand wheel shaft $e^6$ is also mounted in suitable bearings on the said frame, and is disposed longitudinally of the machine. The chain $e^3$ is caused to travel over a pulley $e^7$ on the conveyer, and over a pulley $e^8$ on the frame of the machine, and is operated by a hand wheel shaft $e^9$, disposed longitudinally of the machine and mounted in suitable bearings on the frame thereof. With this arrangement, the chains at one side of the machine can be wound up while the chains at the other side of the machine are being paid out, and in this way the conveyer E can be moved to either side of the machine, according to which one of the two plows is in use. The said conveyer is driven by a belt or sprocket chain $e^{10}$, which travels over sheaves or pulleys $e^{11}$, $e^{12}$, on the frame of the machine, in the manner shown. Said sprocket chain is driven by a sprocket $e^{13}$ on the longitudinally disposed shaft $e^{14}$, which latter is provided with a bevel gear $e^{15}$ adapted to engage the bevel pinions $e^{16}$, $e^{17}$, on the axle $a^4$, in the manner illustrated. A clutch $e^{18}$, operated by a hand lever $e^{19}$, is employed for connecting the bevel gears $e^{16}$, $e^{17}$, with the said axle, and may be thrown from one side to the other, so as to reverse the motion of the power transmitting connection thus provided. In this way the belt or apron of the conveyer E can be caused to travel in either direction, so as to discharge the soil at either end thereof, according to the kind of work being done. It will be seen that the hand lever $e^{19}$ can be easily operated by the attendant standing on the platform $a^1$, which is also true of the hand wheel shafts $e^6$, $e^9$, whereby the operator has the machine under complete control.

It will be seen that the chains $e^2$, $e^3$, are attached to the body frame at one end, and wound upon their respective hand wheel shafts at the other end. It will be understood that all of said hand wheel shafts are provided with suitable ratchet devices, for preventing back rotation thereof, which ratchet devices can be easily thrown out of engagement when the hand wheel shafts are to be operated for unwinding the chains. It will also be understood that the said machine can be provided with suitable draft appliances at its forward end whereby it can be operated either by horses or a traction engine. The belts or aprons of the elevator A and the conveyer E, as well as the plows or implements F, can be of any suitable, known or approved character.

From the foregoing it will be seen that I provide a novel and highly efficient construction, which permits the ditching and grading machine to be operated in either direction, and which permits the soil to be thrown to the right or the left, according to requirements, and regardless of which plow is being used. The machine can be operated along one side of a road or cut, and then turned around and drawn back along the same side of the road or cut, throwing the dirt in the same direction each time. Also, the machine can be started along either side of a road or cut and caused to operate at either side thereof, and then turned around and brought back on either side of the said road or cut. In this way much time is saved, as the machine will not be compelled to travel idle as much as heretofore, and the work to be done will be accomplished in considerably less time. Also, with this arrangement, wagons can be loaded alternately at opposite sides of the machine, without slowing down or stopping the same, thus saving time in this respect. With the exception of the raising and lowering of the elevator, the entire machine is controllable from the rear end thereof, and by an attendant standing on the foot-board or platform in the rear of the conveyer.

It will be seen that the plows are hung outside of the lines of the wheels, and that said plows are spaced apart and mounted for independent raising and lowering. The longitudinally disposed elevator is shiftable from one plow to the other, and is mounted at its rear end upon a pivot or swivel. With this arrangement, either side of the machine can be driven close to the side of a cut or bank, and the soil can be thrown from either side of the machine, regardless of which plow is brought into action.

What I claim as my invention is:

1. In a ditching and grading machine, a plow for each side of the machine, an elevating and conveying apparatus adjustable to receive the soil from either plow and discharge the same from either side of the machine, means for adjusting said apparatus to receive the soil from either plow, and means for raising and lowering said plows independently of each other.

2. In a ditching and grading machine, a plow for each side of the machine, an elevator adapted to have its lower end swung from one plow to the other, means for swinging said elevator from one side to the other, and a reversible conveying apparatus for receiving the soil from the elevator and discharging the same from either side of the machine.

3. In a ditching and grading machine, a plow for each side of the machine, a longitudinally disposed elevator having its lower and forward end supported for movement from one plow to the other for the purpose set forth, and means for moving the lower and forward end of the elevator from one plow to the other.

4. In a ditching and grading machine, a plow for each side of the machine, and an elevator having its rear or upper end pivoted or swiveled to permit its lower and forward end to be swung from one plow to the other, for the purpose set forth.

5. In a ditching and grading machine, a plow for each side of the machine, a longitudinally disposed elevator having its lower and forward end supported for movement from one plow to the other, and suitable instrumentalities for receiving the soil from the upper end of said elevator and discharging the same from either side of the machine, for the purpose set forth.

6. In a ditching and grading machine, a plow for each side of the machine, an elevator having its rear or upper end pivoted or swiveled to permit its lower and forward end to be swung from one plow to the other, and suitable instrumentalities for receiving the soil from the upper end of said elevator and discharging the same from either side of the machine, for the purpose set forth.

7. In a ditching and grading machine, a wheeled body frame, means for tearing up or disrupting the soil at either side thereof, and outside of the lines of the wheels, means for receiving and elevating the soil torn up at either side of the machine, and means for effecting a discharge of the soil from either side of the machine.

8. In a ditching and grading machine, means for tearing up or disrupting the soil, a transversely disposed conveyer, means for reversing the motion of said conveyer, means for giving said conveyer an endwise bodily movement or adjustment across the machine, tracks or ways along which the conveyer travels when moved from one side to the other, and means for elevating the soil and delivering the same to the conveyer.

9. In a ditching and grading machine, the combination with suitable plowing and elevating instrumentalities, a transversely disposed conveyer at the rear end of the machine, means for reversing the motion of said conveyer, tracks or ways along which the conveyer can move to either side of the machine, and means for projecting the conveyer from either side of the machine.

10. In a ditching and grading machine, a body frame, a rear axle, a plow for each side of the machine, and push bars for said plows, the rear ends of said push bars being mounted on the outer ends of said axle.

11. In a ditching and grading machine, a suitable body frame, a plow mounted at each side thereof, front and rear axles between which the plows are disposed, a platform or foot board at the rear end of the body frame, a longitudinally disposed elevator adapted to be swung from one plow to the other, a transversely disposed conveyer positioned back of the elevator and immediately in front of said platform or foot board, and instrumentalities controllable at said platform or foot board, and adapted for lifting and lowering the plows and adjusting the conveyer from one side of the machine to the other.

12. In a ditching and grading machine, suitable instrumentalities for tearing up the soil at either side of the machine, a longitudinally disposed elevator between the two sides of the machine, means for discharging the soil from either side of the machine, and suitable instrumentalities controllable at the rear end of the machine and adapted for regulating the means by which the soil is torn up or discharged at either side of the machine.

13. In a ditching and grading machine, a pair of plows, an elevator adjustable or movable from one plow to the other, and a combined swivel and gear connection for permitting adjustment of the elevator and driving the same.

14. In a ditching and grading machine, a pair of plows, an elevator and a transversely disposed way or track along which the lower end of the elevator is carried from one plow to the other.

15. In a ditching and grading machine, a longitudinally disposed elevator, means at each side of said elevator for tearing up and delivering the soil thereto, wheels having their lines of travel inside of said means, and conveying apparatus for discharging the soil from the side of the machine.

16. The improved ditching and grading machine having provisions for running or working in either direction, as set forth, comprising a longitudinally disposed elevating conveyer movable from side to side, and a pair of plows having a fixed distance apart for throwing the soil onto said conveyer, substantially as shown and described.

17. In a ditching and grading machine, a wheeled body frame, a longitudinally disposed beam at one side of said body frame, a plow mounted on said beam and disposed outside of the line of the wheels, so as to throw the soil inwardly, and an elevator disposed longitudinally between the sides of the body frame and having its forward and lower end extending sidewise to receive the soil from said plow.

18. In a ditching and grading machine, a wheeled body frame, a plow disposed outside of the line of the wheels at one side of the machine, so as to throw the soil inwardly, an elevator disposed longitudinally between the sides of the body frame and having its forward and lower end disposed in position to receive the soil from said plow, and means for receiving the soil from the upper and rear end of said elevator and discharging the same at either side of the machine.

19. In a ditching and grading machine, a pair of plows, and an elevator movable from one plow to the other.

20. In a ditching and grading machine, a pair of plows, means for throwing either plow out of action, and an elevator movable between and from one to the other of said plows.

21. In a ditching and grading machine, a pair of implements, and an elevator movable between and from one to the other of the two implements.

22. In a ditching and grading machine, a plurality of implements, an elevator movable from one implement to another, and means for discharging the soil at either side of the machine.

23. In a ditching and grading machine, a wheeled body frame, a pair of plows running outside of the lines of the wheels, and an elevator shiftable or movable from one plow to the other.

24. In a ditching and grading machine, a longitudinally disposed elevator pivoted or swiveled to swing from one side of the machine to the other.

25. In a ditching and grading machine, an elevator having a pivot or swivel, and means associated with said pivot or swivel for communicating motion to the elevator.

26. In a ditching and grading machine, a wheeled body frame, a longitudinally disposed beam at one side of said body frame, a plow on said beam, a longitudinally disposed elevator having its lower and forward end arranged to receive the soil from said plow, and means at each end of said beam for raising and lowering the same.

27. In a ditching and grading machine, a wheeled body frame, a plow hung on the frame outside of the forward wheel at one side of the machine, so as to throw the soil inwardly, and a longitudinally disposed elevator arranged with the lower and forward end thereof in position to receive the soil from said plow, and means for raising and lowering the elevator relatively to the plow.

28. In a ditching and grading machine, a wheeled body frame, a plow disposed outside of the body frame at one side thereof, an elevator disposed between the two sides of the frame with its forward and lower end in position to receive the soil from said plow, means for raising and lowering the plow relatively to the elevator, and means for raising and lowering the elevator relatively to the plow.

29. In a ditching and grading machine, a wheeled body frame, a plow beam disposed outside of the body frame parallel therewith, a plow on said beam, an elevator disposed between the two sides of the frame with its forward and lower end in position to receive the soil from said plow, means for raising and lowering the forward end of said elevator, means for raising and lowering the forward end of the plow beam, and means for raising and lowering the rear end of said plow beam.

30. In a ditching and grading machine, a wheeled body frame, a plow disposed outside of the body frame at one side thereof, an elevator disposed between the two sides of the body frame with its forward and lower end in position to receive the soil from said plow, and devices for raising and lowering said elevator, the said elevator being arranged obliquely to bring its forward end laterally below the side of the body frame adjacent the plow.

31. In a ditching and grading machine, a wheeled body frame, a plow disposed outside of the body frame at one side thereof, an elevator disposed between the two sides of the frame with its forward and lower end in position to receive the soil from said plow, a conveyer disposed in position to receive the soil from the rear end of the elevator and discharge the same from the side of the machine, means for raising and lowering the plow relatively to the elevator, and means for raising and lowering the elevator relatively to the plow.

32. In a ditching and grading machine, a wheeled body frame, a plow beam disposed outside of the body frame parallel therewith, a plow on said beam, an elevator disposed between the two sides of the frame with its forward and lower end in position to receive the soil from said plow, a conveyer disposed in position to receive the soil from the rear end of the elevator and discharge the same from the side of the machine, means for raising and lowering the forward end of said elevator, means for raising and lowering the forward end of the plow beam, and means for raising and lowering the rear end of said plow beam.

33. In a ditching and grading machine, a wheeled body frame, a plow disposed outside of the body frame at one side thereof, an elevator disposed between the two sides of the body frame with its forward and lower end in position to receive the soil from said plow, a conveyer disposed in position to receive the soil from the rear end of the elevator and discharge the same from the side of the machine, and devices for raising and lowering said elevator, the said elevator being arranged obliquely to bring its forward end laterally below the side of the body frame adjacent the plow.

34. In a ditching and grading machine, an elevator extending rearwardly within the body frame thereof, and means running outside of the body frame at one side thereof for delivering the soil to the forward and lower end of the elevator, as set forth.

Signed at Chicago, Illinois, this 22nd day of July, A. D. 1908.

MORTON G. BUNNELL.

Witnesses:
E. Clegg,
S. Lewis.